United States Patent Office.

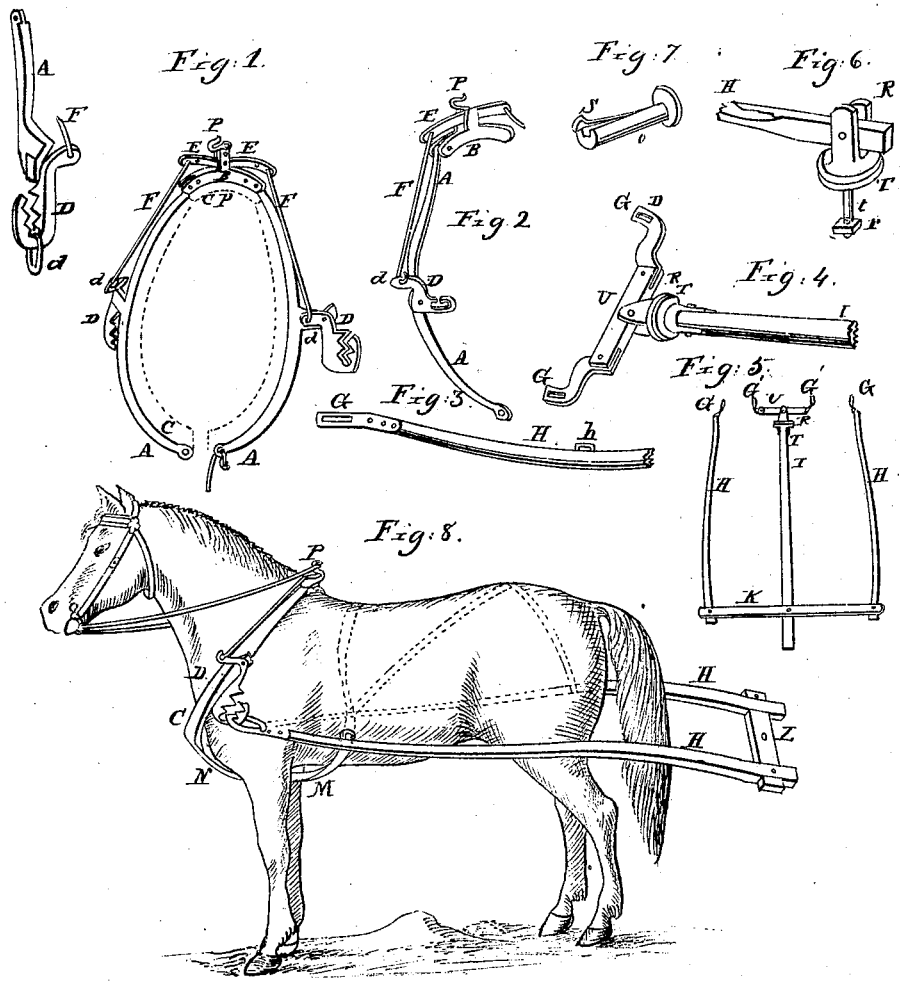

JOHN L. KREIDER, OF CHESTNUT LEVEL, PENNSYLVANIA.

Letters Patent No. 90,669, dated June 1, 1869.

---

IMPROVED APPLIANCE TO HAMES AND MEANS OF HITCHING HORSES TO VEHICLES.

---

The Schedule referred to in these Letters Patent and making part of the same.

---

*To all whom it may concern:*

Be it known that I, JOHN L. KREIDER, of Chestnut Level, in the county of Lancaster, and State of Pennsylvania, have invented new and improved Appliances to Hames and Manner of Hitching Horses to Vehicles; and I do hereby declare that the following is a clear and exact description of the construction and operation of the same, reference being had to the accompanying drawings, making a part of this specification, in which—

Figure 1 is a view of a pair of hames, with my appliances in place. The inside dotted lines indicate the collar; C P, the collar-pad.

Figure 2, a modification of the same, shown in part.

Figure 3, the end of a shaft.

Figure 4, the end of a pole.

Figure 5, pole and shaft combined, for hitching two horses.

Figure 6, a turning-head, slotted, for the end of the side shafts.

Figure 7, a bolt, with a spring used for the adjustable pivots.

Figure 8, a horse hitched in a pair of shafts with my improved gear and mode of hitching.

The nature of my invention consists in the manner of constructing the hames and connecting them to a pole or shafts of vehicles, so as to do away with traces, backing-straps, and the ordinary harness, using nothing but an ordinary bridle and collar, and, at most, a shaft-strap and collar-strap, or girth-like shaft-support, as fully illustrated by fig. 8, in which no girth-like strap is required or used. A breech-band and hip-straps may be used as shown by the dotted lines.

To enable others skilled in the art to make and use my invention, I will more fully describe the same.

The hames A are hinged by a joint and pivot-bolt, s, fig. 7, to a curved plate, B, on each side, said plate resting upon the top, and adapted to the collar-pad.

This plate B has a slotted, or open central bearing, for a vibrating arm, E, equivalent to a small single-tree, affixed centrally in said bearing, in which it is also adjustable for raising or lowering the same, by a spring pivot-bolt, s.

This vibrating arm E is pierced at each end with one or more holes for a stout wire, F, or its equivalent. This wire connects to an arm of or on a vibrating hook, D. This hook is held by a pivot-bolt on the outer side of the hames on which it swings, placed about midway on the same, as shown on each side of the hames A.

The hames with foregoing appliances are otherwise like those in common use, and applied over the ordinary collar c, only that I prefer the collar open below, so that when the hames are loosened, all can be lifted off and hung up together, which constitutes all the harness, so to speak.

An ordinary bridle is used, and the reins fastened to a hook, P, on the top of the central bearings of the vibrating arms, as the most suitable point for attaching the hook.

Ordinary shafts H are provided with a link, or looped cap, G, and staple h, fig. 3, and a strap, M, from the staple of one shaft to that on the other, so that it nearly touches the forward portion of the abdomen of the horse, when placed between the shafts, as shown by fig. 8.

The loops G on the shafts are simply slipped over the hooks D, which latter are so fashioned as to prevent a slight jerk or any amount of jerking to displace them. The operation is such, that the alternate motion of the horse communicates an up-and-down motion of the vibrating bar and hook, by means of the connecting-wire F, giving the horse a perfect freedom, the same as a trace-connection with an ordinary single-tree, but relieving the horse from the chafing action of the traces and ordinary harness.

For holding back, the belly-strap M comes up, and the choke-strap N, connected from it with the collar. At the same time the tendency to push the collar out below, causes the hook on the elevated upper portion to draw on the reins, to elevate the horse's head, giving all the backing power, or for holding back going down-hill, that is required, as I have discovered by a fair test, and found it to work to the admiration of all who witnessed this simple gear and hitching-arrangement. In place of said shaft-strap and choke-strap M N, the straps shown by the dotted lines in fig. 8, may be used.

The arrangement of my vibrating arm and supporting-plates, and connection with the hook, might be reversed in position on the collar, which, however, I deem substantially the same.

To make my device equally applicable for the use of two horses, a slight change is only necessary in the construction of the pole, on its outer end, which is shown by fig. 4.

I, the pole; T, a cap, fitted over the end, with a flat disk, to which another disk R is fitted, and secured by a headed screw-bolt, on which the disk R, with its slotted conical head, can turn clearly round.

A vibrating arm, or single-tree, U, is affixed by a pivot in the slotted head.

The ends of this arm U are slotted for a hitching-link G, also movable on pivots.

A rear cross-piece, K, double-tree like, is centrally connected with the pole by a pivot-bolt.

To the ends of this cross-piece K, at the proper distance from the pole to admit a horse on each side of the same, a shaft, H, or its equivalent, is affixed by a pivot, on which it has a lateral swing, as well as moving in the centre on the pole, or these shafts may also have a vertical, as well as a turning motion. By using a slotted head, on each end of K, for the shafts H, shown by fig. 6, substantially the same as that on the end of the pole, only differing in position, the same construction can be applied; so that by connecting the loops G with the shafts H, or their equivalent, to the outside hooks D, on the hames, and the loop G, on the arm U of the pole, with the inside hooks of the same, both horses are hitched.

The shafts H yield with any lateral motion of the horses right and left, without affecting the central position of the pole, and should one horse fall, the turning-head or swivel R T will prevent the strain on the pole, and accommodate itself to the position of the one horse, without affecting that of the other.

These side shafts can be turned back laterally, or with the turning-head connection, both laterally and vertically, if that is desirable, to facilitate hitching or protecting them.

Considering the cost of harness-leather, the cheapness and durability of iron, the conveniences for hitching or unhitching, the perfect freedom from chafing of the traces, and freedom of motion, it is deemed a valuable improvement, simple and efficient.

I am not aware of any mode in use where traces and other portions of harness are dispensed with, substantially in the manner shown and described.

What I claim as my invention, and desire to secure by Letters Patent, is—

1. The vibrating bar E and hook D, when connected by the rods F and applied to hames of substantially the described construction, for the purpose set forth.

2. The hook D, constructed substantially as described, when combined with the loop G, upon the end of the shaft, or pole, as and for the purpose set forth.

3. The turning-bar U, constructed substantially as described, when used in connection with the hook D, as and for the purpose set forth.

JOHN L. KREIDER.

Witnesses:
   J. F. ANDREWS,
   JACOB STAUFFER.